Feb. 18, 1930.  F. A. CALKINS  1,747,697
DIRECTION SIGNAL OPERATING SWITCH
Filed July 19, 1927
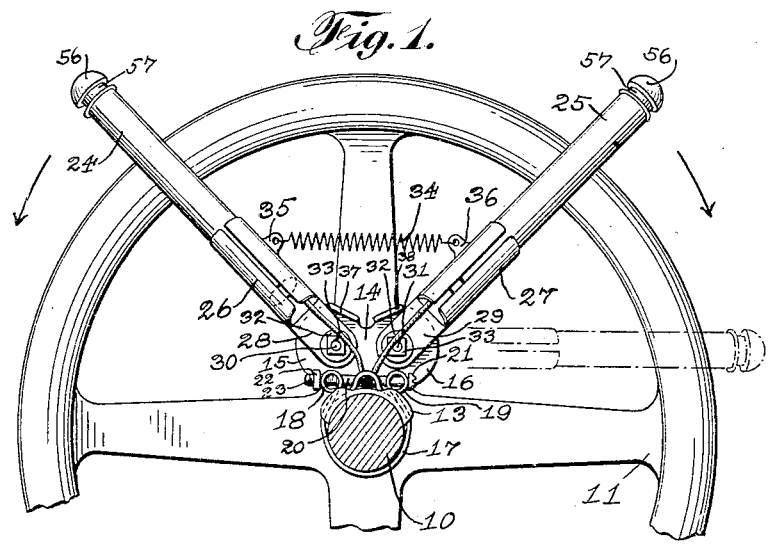
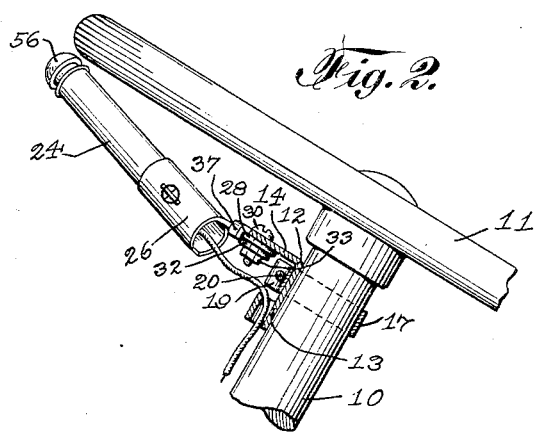
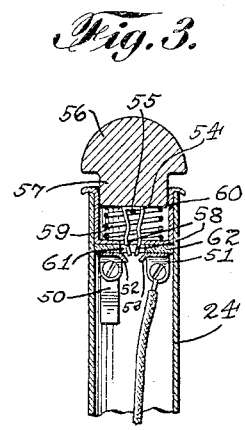
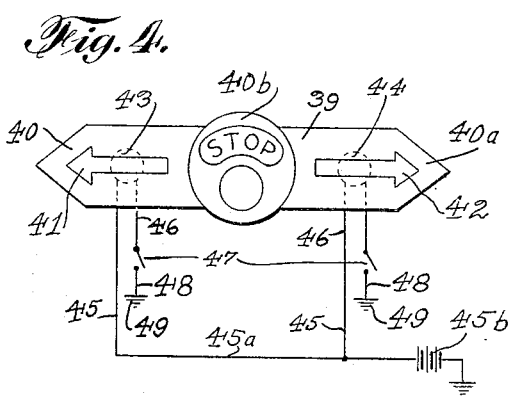
INVENTOR
Frederic A. Calkins
BY
H. G. Manning
ATTORNEY Patented Feb. 18, 1930

1,747,697

UNITED STATES PATENT OFFICE

FREDERIC A. CALKINS, OF WATERBURY, CONNECTICUT

DIRECTION-SIGNAL-OPERATING SWITCH

Application filed July 19, 1927. Serial No. 206,901.

This invention relates to vehicle signals, and more particularly to a switch mechanism whereby a pair of electrically operated direction signals may be controlled by the fingers of the driver of a vehicle without removing his hands from the steering wheel.

One object of this invention is to provide a direction signal operating switch mechanism which can be readily attached to the steering wheel and steering post of an automobile.

A further object is to provide a switch mechanism of the above nature having a pair of radially mounted switch members located slightly below and extending beyond the periphery of the steering wheel, and in convenient position to be operated by the finger tips of both hands of the driver.

A further object is to provide a steering wheel switch mechanism in which the switch members are provided with spring-pressed buttons adapted to close electrical circuits through illuminated signal members.

A further object is to provide a direction signal attachment of the above nature in which the radial switch members are pivotally mounted in such a manner that they will be capable of swinging parallel with the steering wheel, whereby the signal members will remain under full control of the driver at all times.

A further object is to provide a direction signal of the above nature which will be simple in construction, inexpensive to manufacture, easy to install and manipulate, compact, ornamental in appearance, and very efficient and durable in use.

With these and other objects in view there has been illustrated on the accompanying drawings one form in which the invention may be conveniently embodied in practice.

Fig. 1 represents a fragmentary bottom view of a steering wheel having the signal switch mechanism installed thereon, the steering post being shown in section.

Fig. 2 is a fragmentary side view of the same.

Fig. 3 is a longitudinal sectional view of one of the switch operating members showing the push button in its normal open circuit position.

Fig. 4 is a view showing one of the direction signal members, and a diagram of the electrical circuit connections.

Referring now to the drawings in which like reference numerals denote corresponding parts throughout the several views, the numerals 10 and 11 respectively indicate a steering post and a steering wheel of a motor vehicle, not shown. The switch members for controlling the direction signals are supported on the steering post 10 by a bracket 12 having a semi-tubular section 13 fitted about the front of said steering post 10. The bracket 12 also has a flat bifurcated upper plate section 14 provided with a pair of substantially circular side wings 15 and 16.

The semi-tubular section 13 is adapted to be held in any desired vertical position on the steering post 10 as by a clamping band 17, said clamping band having its extremities 18 and 19 bent into the form of circular loops, as clearly shown in Figs. 1 and 2. The clamping band 17 is adapted to be tightened by a bolt 20 having a slotted head 21, a nut 22 being screwed on the threaded end 23 of said bolt 20.

In order to permit the controlling switch members to be operated by the fingers of both hands of the driver without removing said hands from the steering wheel 11, provision is made of a pair of radially extending tubular switch members 24 and 25, said tubular members being adjustably and slidably telescoped within a pair of split collar members 26 and 27 respectively. The split collar members 26 and 27 have flat end sections 28 and 29 pivotally mounted in flat contact with the under surface of the plate 14, said end sections 28 and 29 being held securely in position by pivot bolts 30 and 31, respectively. The pivot bolts 30 and 31 are locked in place by washers 32 and nuts 33 mounted on the threaded ends thereof.

In order to normally maintain the tubular switch members 24 and 25 in their foremost positions shown in Fig. 1, provision is made of a spiral spring 34 having its ends connected respectively to eyes 35 and 36 located on the split collars 26 and 27. The semicircular side wings 15 and 16 of the bracket 12 are provided with a pair of downturned stop lugs 37 and 38 which serve to limit the forward swinging movement of the tubular members 24 and 25.

Each of the illuminated direction signal members, which may be located at any convenient place on the vehicle, and one of which is shown in Fig. 4, comprises a casing 39 having pointed ends 40 and 40$^a$ together with a central circular stop light 40$^b$. Adjacent the left-hand and right-hand ends 40 and 40$^a$ of the casing 39, transparent outwardly pointing arrow-shaped sections 41 and 42 are formed, behind which illuminating lamps 43 and 44 are located. One terminal 45 of each of the lamps 43 and 44 is connected to a conductor 45$^a$ leading to a suitable source of current, such as the car battery 45$^b$. The other terminals 46 of said lamps 43 and 44 are connected to the control switches, generally indicated in Fig. 4 by the numeral 47, said control switches in turn being connected to conductors 48 grounded at 49 on any convenient parts of the car.

Each of the control switches for the direction signals comprises a pair of angle plates 50 and 51, preferably soldered to the tubular switch members 24 and 25, as shown in Fig. 3. The angle plates 50 and 51 have inclined resilient contact points 52 and 53, said contact points being adapted to be engaged by a movable U-shaped metallic connecting member 54 secured as by a screw 55 to the reduced end 57 of a push button 56. The extremities 58 of the connecting member 54 converge inwardly for yieldingly contacting with the points 52 and 53 of the angle plates 50 and 51. The push buttons 56 are normally held in their outermost positions shown in Figs. 1, 2, and 3 by small spiral springs 59 carried in flanged socket members 60, said socket members being held by friction in the outer end of the tubular switch members 24 and 25. The socket members 60 have apertures 61 in their bases to surround the connecting members 54, and said socket members are separated from the angle plates 50 and 51 as by washers 62 of any suitable insulating material.

In operation, when the driver wishes to indicate that the car is to turn to the left, he will press the push button 56 which is in proximity to his left hand without removing his hand from the steering wheel. By holding on to the tubular member 25 while turning the wheel, said tubular member may be swung down about its pivot 31, so that the signal may be maintained continuously until the car has completed the turn. After the car has made the turn and the steering wheel has again been straightened out the tubular member 25 and the push button 56 may be released, whereupon they will return to their original normal positions, shown in Fig. 1, under the action of the springs 34 and 59 respectively.

When the driver desires to indicate that the car is to make a right-hand turn, the operation will be the same as just described except that he will manipulate the right-hand push button 56 and swing the tubular member 24 from the full line to the dotted line position shown in Fig. 1.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a direction signal switch for a vehicle controlled by a steering wheel, a switch for controlling an electrically-operated signal member mounted adjacent and adapted to swing with said steering wheel when desired, said switch being in position to be manipulated conveniently by the fingers of one hand of the driver without removing his hand from the steering wheel, said switch being carried at the end of a radial tube pivotally mounted with respect to the steering post and capable of swinging through a limited arc parallel to the rim of said steering wheel, said tube extending beyond the periphery of said steering wheel.

2. In a direction signal switch for a vehicle controlled by a steering wheel, a switch for controlling an electrically operated signal member mounted adjacent and adapted to swing with said steering wheel when desired, said switch being in position to be manipulated conveniently by the fingers of one hand of the driver without removing his hand from the steering wheel, said switch being carried at the end of a radial tube pivotally mounted with respect to the steering post and capable of swinging through a limited arc, said tube being longitudinally adjustable in length to fit steering wheels of various diameters.

3. In a direction signal switch for a vehicle controlled by a steering wheel, a pivotally mounted radial tube supported by the steering post and unconnected with said steering wheel, said tube having a push button switch in its outer end for controlling an electrically operated signal member, and means for longitudinally adjusting said tube for arranging said push button in position to be conveniently manipulated by the fingers of the driver without removing his hand from the steering wheel.

4. In a direction signal switch for a vehicle controlled by a steering wheel, a pair of pivotally mounted radial switch-holding tubes supported by the steering post and unconnected with said steering wheel, said switches controlling a pair of signal members, one of said tubes being adapted to swing rearwardly with the steering wheel when the vehicle is making a turn, and a spring connected to both of said tubes for normally maintaining said tubes in their foremost positions.

5. In a direction signal switch for a vehicle controlled by a steering wheel, a bracket mounted on the steering post of said wheel, said bracket having a flat shelf extending forwardly of said post, a pair of switch-holding radial tubes pivoted to said shelf and unconnected with said steering wheel, said tubes being adapted to be selectively swung about their pivots by the fingers of the operator when the wheel is turned.

6. In a direction signal switch for a vehicle controlled by a steering wheel, a bracket mounted on the steering post of said wheel, said bracket having a flat shelf extending forwardly of said post, a pair of switch-holding radial tubes pivoted to said shelf and unconnected with said steering wheel, said tubes being adapted to be selectively swung about their pivots by the fingers of the operator when the wheel is turned, the pivot points of said tubes being eccentric to the steering post.

7. In a direction signal switch for a vehicle controlled by a steering wheel, a bracket mounted on the steering post of said wheel, said bracket having a flat shelf extending forwardly of said post, a pair of switch-holding radial tubes pivoted to said shelf, said tubes being adapted to be selectively swung about their pivots by the fingers of one hand of the operator when the wheel is turned, said shelf having stops to limit the rotation of said tubes.

In testimony whereof, I have affixed my signature to this specification.

FREDERIC A. CALKINS.